Figure 1:
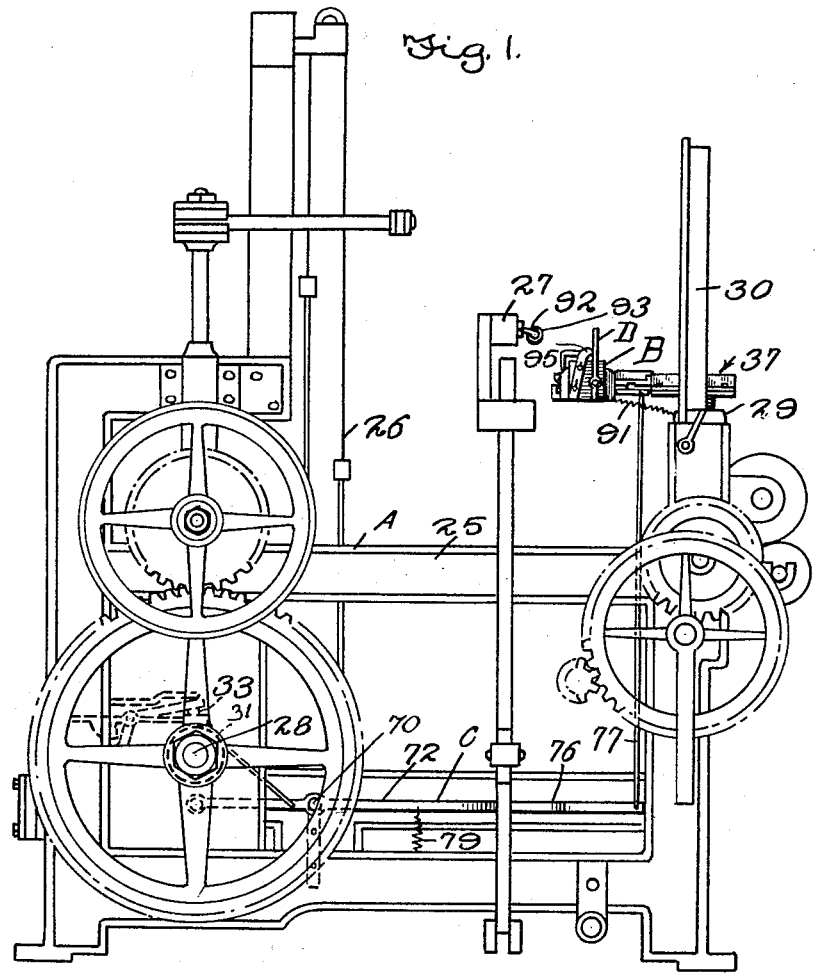

March 17, 1931. H. C. BAUSINGER, JR., ET AL  1,796,858
FORK ATTACHMENT FOR LOOMS
Filed March 1, 1926  6 Sheets-Sheet 1

Henry C. Bausinger, Jr. INVENTORS
Howard D. Barnes
BY
Richard B. Owen
ATTORNEY.

Witnesses

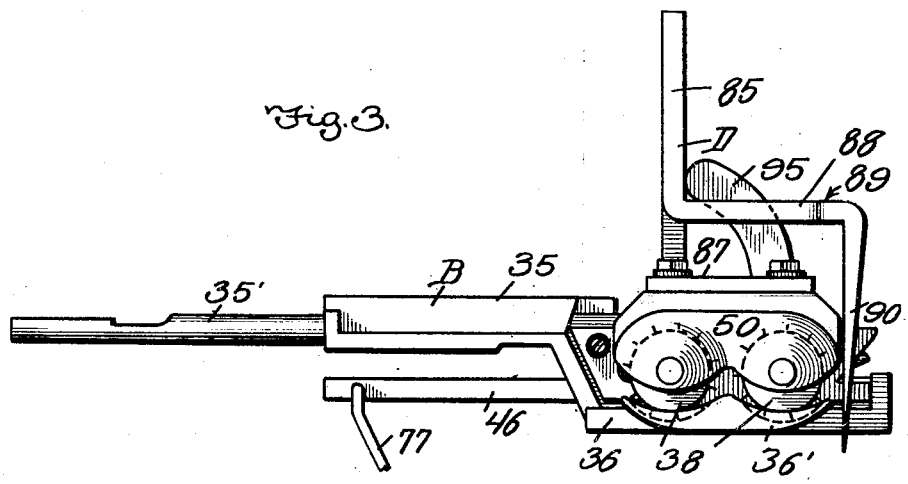
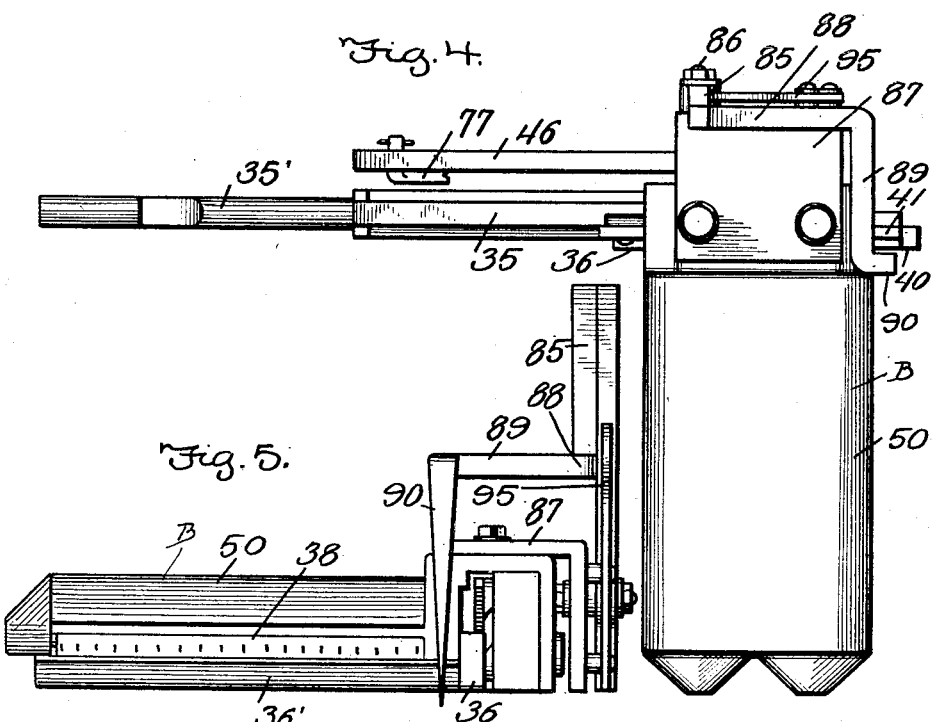

March 17, 1931.   H. C. BAUSINGER, JR., ET AL   1,796,858
FORK ATTACHMENT FOR LOOMS
Filed March 1, 1926    6 Sheets-Sheet 4

Henry C. Bausinger, Jr.  INVENTORS
Howard D. Barnes

Witnesses
C. E. Churchman Jr.
G. W. Wright

BY
Richard B. Owen
ATTORNEY.

March 17, 1931.  H. C. BAUSINGER, JR., ET AL  1,796,858
FORK ATTACHMENT FOR LOOMS
Filed March 1, 1926   6 Sheets-Sheet 5
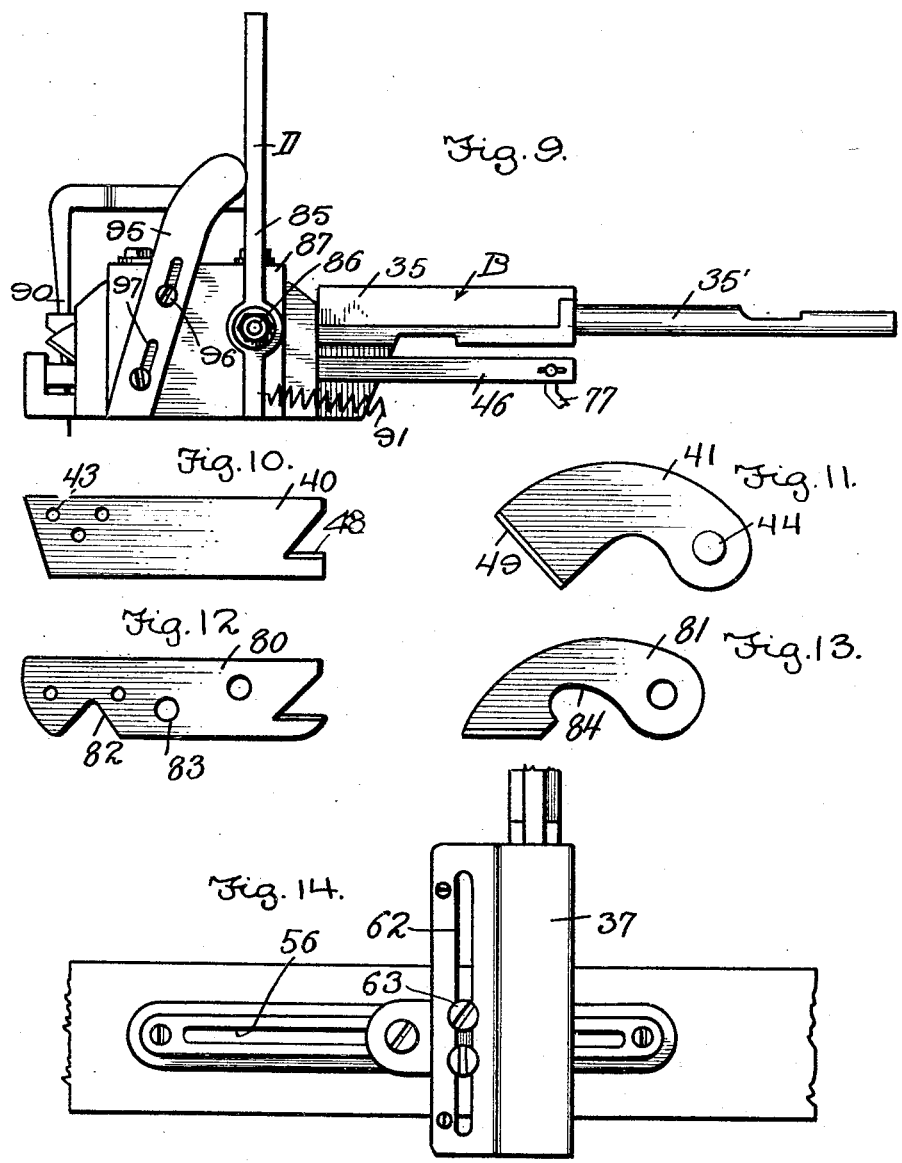
Henry C. Bausinger, Jr, INVENTORS
Howard D. Barnes
Witnesses
BY
ATTORNEY.

March 17, 1931. H. C. BAUSINGER, JR., ET AL 1,796,858
FORK ATTACHMENT FOR LOOMS
Filed March 1, 1926 6 Sheets-Sheet 6

Henry C. Bausinger, Jr.,
Howard D. Barnes INVENTORS
BY
Richard B. Owen
ATTORNEY.

Witnesses
C. E. Churchman Jr.
Wm. W. Wright

Patented Mar. 17, 1931

1,796,858

UNITED STATES PATENT OFFICE

HENRY C. BAUSINGER, JR., OF BUCYRUS, AND HOWARD D. BARNES, OF KENT, OHIO, ASSIGNORS OF EIGHTEEN AND THREE-FOURTHS PER CENT TO JOHN O. TURNER, EIGHTEEN AND THREE-FOURTHS PER CENT TO WALTER G. BAIER, AND EIGHTEEN AND THREE-FOURTHS PER CENT TO GEORGE W. FAULKNER, ALL OF BUCYRUS, OHIO

FORK ATTACHMENT FOR LOOMS

Application filed March 1, 1926. Serial No. 91,626.

This invention appertains to looms and more particularly to a novel attachment therefor.

The primary object of the present invention is to provide a novel temple for engaging the selvage of the fabric being woven, in such a manner, that the fabric, irrespective of the thickness or width thereof will be effectively held and prevented from narrowing inward.

A further object of the invention is the provision of novel means for mounting the temples upon the loom whereby the temples can be adjusted relative to the fabric being woven.

A further object of the invention is the provision of novel means for arranging the weft cutting mechanism upon the temple, whereby the thread will be cut close to the selvage, thereby effectively eliminating the necessity of cutting loose threads by hand and the like.

A further object of the invention is the provision of novel means for automatically operating the weft cutting mechanism from the automatic shuttle changing cam of the looms.

A further object of the invention is the provision of a novel selvage fork carried by the temple and automatically operated by the lay beam upon each beat thereof for engaging the selvage to hold the cloth positively against narrowing and obviating the necessity of employing a thread director.

A still further object of the invention is to provide a novel attachment for looms of the above character, which will be durable and efficient in use, one that will be simple and easy to manufacture and one which can be placed upon the market and incorporated with a standard loom, at a small cost, without any change thereto.

Figure 2:
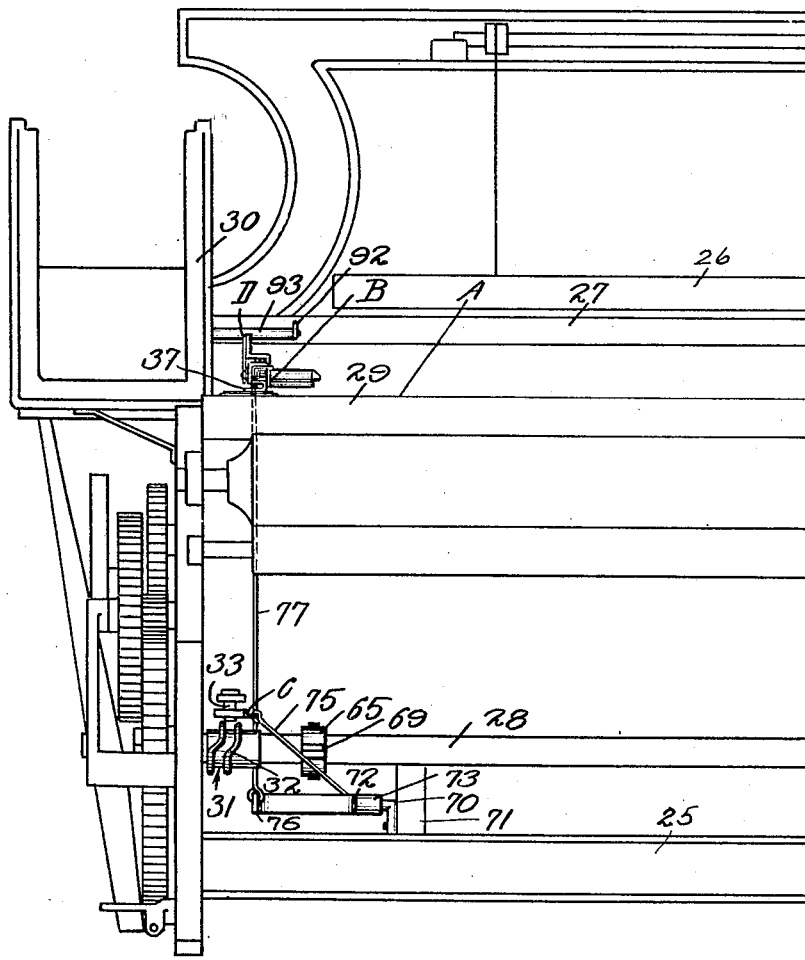
Figure 6:
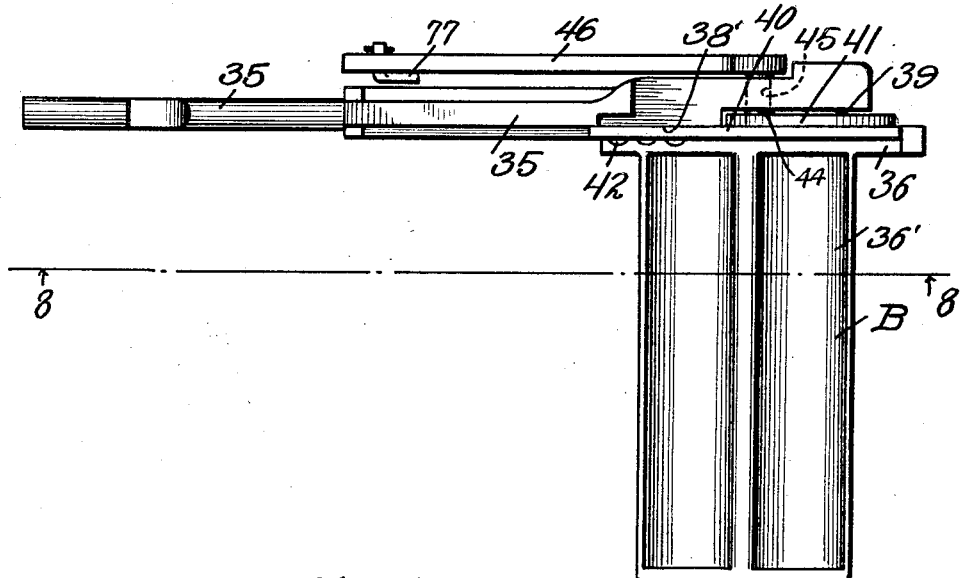
Figure 7:
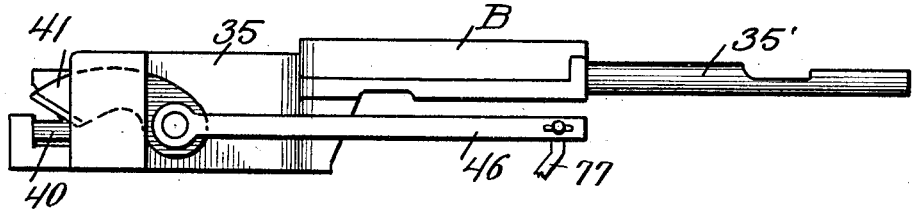
Figure 8:
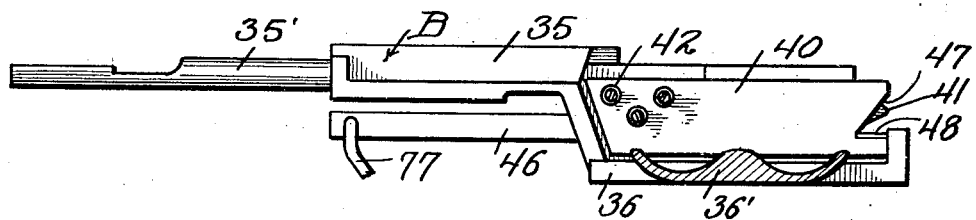
Figure 15:
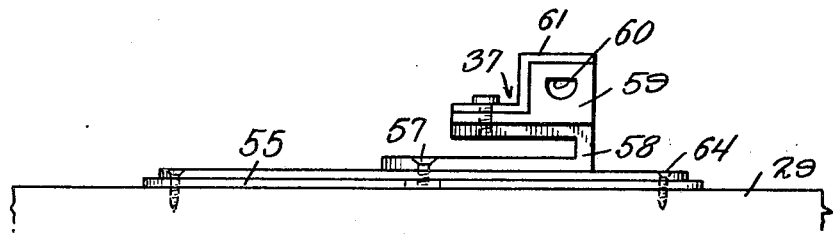
Figure 16:
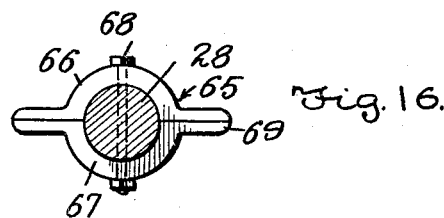
Figure 17:
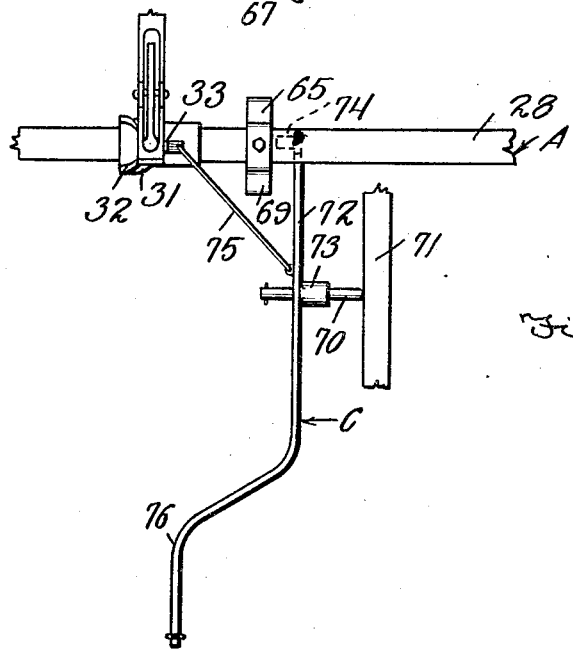

With these and other objects in view, the invention consists in the novel construction, arrangement and formation of parts, as will be hereinafter more specifically described, claimed, and illustrated in the accompanying drawings, in which drawings:

Figure 1 is a side elevation of a loom showing the novel thread cutting temple in place thereon, the loom being of the automatic shuttle changing type, Figure 2 is a fragmentary rear elevation of a loom showing the improved thread cutting temple in place thereon, only sufficient portions of the loom being shown to illustrate the use of our invention, Figure 3 is a side elevation of the improved temple showing the selvage engaging fork thereon, the temple being shown removed from the loom, Figure 4 is a top plan view of the improved thread cutting temple with the selvage fork in place thereon, the temple being shown removed from the loom, Figure 5 is a front elevation of the novel thread cutting temple with the selvage fork in place thereon, Figure 6 is a plan view of the thread cutting temple with the cover and roller of the temple removed, Figure 7 is a side elevation of the thread cutting temple with the cover plate removed illustrating the arrangement of the removable knife on said temple, Figure 8 is a section taken on the line 8—8 of Figure 6 looking in the direction of the arrows, Figure 9 is a side elevation of the complete thread cutting temple with the cover in place and the selvage engaging fork carried thereby, Figure 10 is a detail elevation of the stationary knife of the thread cutting temple, Figure 11 is a detail side elevation of the movable knife of the thread cutting temple, Figure 12 is a detail view of a slightly modified form of stationary knife which can be used on a conventional type of temple, Figure 13 is a detail side elevation of a slightly modified form of movable knife which can be used on a conventional type of temple, Figure 14 is a top plan view showing the socket for supporting the temple, the socket being adjustably mounted on the table or apron of the loom, Figure 15 is a front end view of the socket employed for holding the temple showing the same mounted on the apron or table of the loom, Figure 16 is a detail section through one of the operating shafts of the loom illustrating the operating cam attached thereto for operating the thread cutting temple, Figure 17 is a fragmentary plan view illustrating the novel means employed for moving the actuating lever of said thread cutting temple in the path of the operating cam therefor, said means being employed in conjunction with the usual shuttle changing cam of the loom, Referring to the drawings in detail, wherein similar reference characters designate corresponding parts throughout the several views, the letter A generally indicates a loom of the automatic shuttle changing type; B the novel thread cutting temple arranged on the loom adjacent to the holder for the shuttles and C the novel mechanism employed for operating the cutting mechanism of said thread cutting temple.

As stated the loom A is of conventional automatic shuttle or bobbin changing type and only sufficient parts thereof have been shown to illustrate the use of the invention, and as shown the loom includes the usual frame 25, the harness 26 for making the shed, the swinging lay beam 27 and the cam shaft 28. The loom also includes the usual table or apron 29 adjacent to one end of which is placed the frame 30 for holding the shuttles of the automatic shuttle changing mechanism. In the form of looms shown, the cam shaft 28 has mounted thereon in the usual manner the shuttle changing cam 31 which includes a pair of spaced cam tracks 32 between which is adapted to ride a shuttle changing operating arm 33, which is moved into engagement with the cam by the shuttle changing mechanism (not shown) which forms no part of the present invention. While I have shown a shuttle changing cam upon the cam shaft 28, it is to be understood that the cam can be placed on any suitable operating shaft of the loom, as contemplated in some other types of looms.

The temple B is of a novel construction and forms a part of the present invention and includes a body 35 having a shank 35' formed thereon at one end thereof, which is adapted to be received in the socket 37, as will be hereinafter more fully described. The body 35 has offset downwardly therefrom an extension 36 which carries the laterally projecting plate 36' grooved longitudinally to receive the temple rollers 38, which in the present instance have been shown two in number. The inner face of the extension 36 is recessed at 38' and 39 for the reception of the rigid and movable knives 40 and 41 respectively. It is to be noted that the rigid knife 40 is of a greater length than the movable knife and is connected to the extension by suitable retaining elements 42, which are extended through openings 43 in the said extension. The inner end of the movable knife 41 is provided with a laterally extending trunnion 44 which is rockably mounted within a suitable bearing opening 45 formed in the extension. This trunnion 44 extends beyond the extension and has keyed or otherwise secured thereto a rearwardly extending crank arm 46 for a purpose, which will be hereinafter more fully described. The inner end of the rigid cutting knife 40 is provided with a V-shaped notch 47 the lower face of which is sharpened to provide a cutting edge 48. This V-shaped notch receives the weft thread or filling when the shuttle is at the end of the loom adjacent to the temple carrying the knives. The movable knife 41 is of a substantial arcuate shape and has its forward end provided with a cutting edge 49 for movement past the cutting edge 48 of the rigid knife and the edge 49 is arranged at an angle to the edge 48, so that a substantial shearing cut will be had. It might be well to point out at this time, that the temple which is provided with the knives is arranged adjacent to that portion of the loom provided with the shuttle reloading magazine, while a similar temple with the exception of the cutting knives is arranged on the opposite end of the loom.

A cover 50 is provided for the temple and this cover is provided with suitable bearings for receiving the rollers 38 which are provided with teeth or other cloth engaging means in the usual way. The cover is bolted or otherwise secured to the extension 36 as clearly shown in Figure 4 of the drawings. The temple itself, without the cutting knives can be used on looms without automatic shuttle changing mechanism.

The temples B are secured upon the table or apron 29 of the loom A by the sockets 37 in such a manner that the temple can be adjusted transversely of the loom toward and away from one another and longitudinally of the loom toward and away from the lay beam. Each socket 37 includes a base plate 55 provided with a longitudinally extending slotted way 56 in which is slidably mounted a suitable bolt and nut 57 carried by the plate slide 58 which is of a substantially U-shape. The upper end of the plate slide forms a rest for the stand 59 of the socket, which is provided with the way 60 for the reception of the shank 35' of the temple. A suitable cap 61 is provided for the stand and the cap and stand are provided with a longitudinally extending guide slot 62 in which are received the cap screws 63 carried by the plate slide 58. It is obvious that by this construction that the plate slide can be adjusted on the base plate in the desired position and that the stand 59 can be adjusted on said plate slide toward or away from the lay beam. The shank of the temple is held within the way 60 and held in place in any desired method. The base plate 55 is secured to the apron 29 of the loom in any preferred way, such as by screws 64.

The operating means C for the cutting knives of the temple embodies a throw or knocker cam 65 which can be also secured to the cam shaft 28 in spaced relation to the cam 31 for the shuttle changing mechanism. In order to facilitate the application of the cam 65 to the side shaft of the loom, the same includes a pair of companion sections 66 and 67 which are bolted together and to the shaft 28 by the diametrically extending bolt 68. This cam at diametrically opposed points and at quarters to the bolt 68 is provided with the throw or knocker arms 69. Rockably and slidably mounted upon a suitable supporting rod 70, which is carried by a fixed part 71 of the base portion of the frame 25 of the loom is an operating lever 72. This lever 72 at a point intermediate its ends is provided with a hub 73 which fits said supporting rod 70. The hub is interiorly of a diameter greater than the rod, so as to permit transverse angular movement of the lever 72 upon the said rod 70 as well as vertical swinging adjustment. The inner end of the lever is provided with a pin on which is mounted a suitable anti-friction roller 74 and this roller is adapted to be moved into the path of the cam arm 69 for rocking the lever 72 in its vertical plane as will be hereinafter more fully described. Connected with the cam engaging shoe or rider 33 is a link 75 which is also secured to the lever 72 adjacent to the hub 73. By this arrangement when the cam shoe 33 is moved by the shuttle changing mechanism between the tracks 32 of the cam 31, the lever 72 will be moved transversely by said cam 31 and the roller 74 will be moved into the path of the arm 69 of the cam 65 to bring about the rocking of said lever. The outer end of the lever 72 is offset as at 76 in order to bring the extreme outer end thereof substantially in direct vertical alinement with the operating crank 46 and the outer end of the crank is connected to the outer end of the lever by means of a suitable link 77.

In the operation of the improved temple cutting knife the cloth is fed under the temple rollers 38 in the usual manner and on each stroke of the shuttle and in the forward beat up of the lay the weft will pass between the stationary and movable knives 40 and 41. When the shuttle changing mechanism is thrown into operation, the cam shoe 33 will be moved laterally forcing the roller 74 in the path of the cam arm 69 and the throw of the cam arm 69 with the roller will rock the lever 72, which through the medium of the link 77 will lift up on the operating crank 46 and swing the cutting edge of the movable knife 41 into cutting contact with the weft or filling thread, thus effectively severing the weft and cutting the same close to the selvage.

It is again noted that the cams 31 and 65 can be secured both to the same shaft, such as the cam shaft 28 or to different rotating shafts of the loom as may be desired. Also the improved device can be used on various types of automatic shuttle changing looms and while I have shown the magazine of such a shuttle changing mechanism on the left hand side of the loom, it is to be understood that the same can be placed on the right hand side in which contingency the temple provided with the cutting knives is likewise placed on the right hand side of the loom.

In some instances the improved weft thread cutting device can be applied to temples now on the market and in order to facilitate the application of said cutting mechanism to ordinary temples, I provide a special type of stationary cutting blades 80 and a special type of movable thread cutting blades 81. The stationary blade 80 is of substantially the same shape as the blade 40 with the exception that one longitudinal edge thereof is provided with a notch 82 and it is provided with additional openings 83 to permit the convenient attachment thereof to said various types of temple. The movable knife 81 is also provided at its lower edge with a relatively deep notch 84, so as to skip parts formed on the conventional temple.

When the improved weft thread cutting temple is being used on looms weaving heavy fabrics such as carpets and the like I prefer to use the novel selvage fork D in order to engage the selvage to prevent narrowing of the fabric. This selvage fork D includes an upstanding rocking lever 85, which is rockably mounted adjacent to its lower end upon a suitable bolt 86 attached directly to the cover 50 or to an angle plate 87 connected with said cover. Secured to and formed on the lever 85 is an inwardly extending arm 88, which has in turn formed thereon the laterally extending arm 89. This arm carries the depending penetrating point 90 which forms the fork per se. The lower end of the lever 85 has secured thereto a contractile coil spring 91 which acts to throw the penetrating point 90 in engagement with the first mesh at the selvage to prevent narrowing-in of the web. The lay beam 27 is provided with a bracket 92 which carries a roller 93 and the upper end of the lever 85 is disposed in the path of said roller 93, so that upon each beat of the lay beam the lever will be rocked against the tension of the spring 91 for moving the fork 90 above and out of engagement with the selvage of the cloth being woven. As soon as the lay beam starts its return movement toward the harness and during the picking operation and when the lay is at rear center the fork will be thrown in engagement with the first mesh at the selvage and prevent the web from narrowing-in.

In order to limit the stroke of the lever 85 an adjustable stop 95 can be secured to the angle plate 87 as clearly shown in Figure 9 of the drawings. This stop 95 is adjustably secured in place by means of screws 96 extending through suitable slots 97 in said adjustable stop.

From the foregoing description, it can be seen that we have provided a novel thread cutting temple and selvage fork, which can be readily applied to any automatic shuttle changing machine and which will positively operate under all conditions. It is to be noted that wear on the cutting blades is reduced to a minimum, in that the blades are only operated when a shuttle is being changed, this being in contra-distinction to the knives which are continuously operated. The temple is also so constructed as to permit the ready removal of the knives to allow the easy sharpening thereof.

Changes in details may be made without departing from the spirit or the scope of this invention, but,

What we claim as new is:

In a loom, a cam shaft, a shuttle changing cam on said cam shaft, a filling cutting device including a rigid knife and a rockable knife, a crank arm secured to the rockable knife, a rocking lever for swinging movement in a vertical plane and a sliding horizontal movement, a link connecting the crank arm with one end of the lever, means for holding the lever in a predetermined position for holding the movable knife in a raised position relative to the rigid knife, a cam keyed to said cam shaft, and means operatively connecting the inner end of the lever to the shuttle changing cam for moving the inner end of the lever into and out of the path of said last mentioned cam.

In testimony whereof we affix our signatures.

HENRY C. BAUSINGER, Jr.
HOWARD D. BARNES.